(12) United States Patent
Saito

(10) Patent No.: US 6,896,995 B2
(45) Date of Patent: May 24, 2005

(54) BATTERY COVER

(75) Inventor: Satoshi Saito, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 325 days.

(21) Appl. No.: 09/861,679

(22) Filed: May 22, 2001

(65) Prior Publication Data
US 2001/0049055 A1 Dec. 6, 2001

(30) Foreign Application Priority Data
May 25, 2000 (JP) ..................................... P.2000-155236

(51) Int. Cl.[7] .............................................. H01M 4/04
(52) U.S. Cl. ......................... 429/163; 429/99; 429/158
(58) Field of Search ......................... 429/99, 100, 163, 429/59, 83, 158, 149, 175, 177, 176, 179; 340/628, 69.7

(56) References Cited

U.S. PATENT DOCUMENTS

| | | | | |
|---|---|---|---|---|
| 2,671,819 A | * | 3/1954 | Field ............................ | 429/65 |
| 4,076,901 A | * | 2/1978 | Fritz et al. ..................... | 429/50 |
| 6,077,107 A | * | 6/2000 | Hetherington .............. | 439/500 |
| 6,166,520 A | * | 12/2000 | Waters et al. ............... | 320/107 |
| 6,261,719 B1 | * | 7/2001 | Ikeda et al. .................. | 429/211 |
| 6,312,851 B1 | * | 11/2001 | Fukuda et al. ............... | 429/176 |
| 6,326,097 B1 | * | 12/2001 | Hockaday ..................... | 429/34 |
| 6,523,274 B1 | * | 2/2003 | Saito et al. .................... | 33/562 |

FOREIGN PATENT DOCUMENTS

JP           2-118415        9/1990    ............ H02G/3/04

* cited by examiner

Primary Examiner—Frankie L. Stinson
Assistant Examiner—Monique Wills
(74) Attorney, Agent, or Firm—Sughrue Mion, PLLC

(57) ABSTRACT

A power source device (2) includes a plurality of small batteries (3), a plurality of bus bars (4), a casing (5), and a battery cover (1). The small batteries (3) are stacked together in such a manner that positive electrodes (7), as well as negative electrodes (8), are alternately reversely directed. The bus bars (4) are embedded in the casing (5), and when the casing (5) covers end portions of the small batteries (3), the electrodes (7, 8) are connected together. The battery cover (1) includes a cover body (11), opening/closing covers (12), and hinges (13). The cover body (11) is attached to the casing (5). The opening/closing covers (12) can be displaced between their respective closed positions where the opening/closing covers (12) respectively cover the electrodes (7, 8) and their respective open positions where the electrodes (7, 8) are exposed.

10 Claims, 4 Drawing Sheets

BATTERY COVER

BACKGROUND OF THE INVENTION

1. Field of the Invention

The present invention relates to a battery cover for covering a battery mounted on a vehicle, for example, a hybrid car capable of traveling by powers of both of an internal combustion engine and an electric motor, an electric car, etc.

The present application is based on Japanese Patent Application No. 2000-155236, which is incorporated herein by reference.

2. Description of the Related Art

In recent years, hybrid cars (capable of traveling by powers of both of an internal combustion engine and an electric motor) and electric cars have been used since such cars are gentle for the environment, and a high-voltage/high-output power source has now been required for such cars so that the car can travel smoothly.

In order to achieve a high-voltage/high-output power source, for example, a power source device 101 (see FIG. 4) comprising relatively-small batteries serially connected together may be considered.

The battery device 101, shown in FIG. 4, comprises the plurality of small batteries 103, a plurality of bus bars 104, a casing 105, and an electrode cover 106. Each of the small batteries 103 has a positive electrode 107 provided at one end thereof, whereas a negative electrode 108 is provided at the other end thereof. The small batteries 103 are stacked together in such a manner that the positive electrodes 107 are disposed in adjoining relation to the corresponding negative electrodes 108, respectively. Any two adjacent small batteries 103 are disposed such that the positive electrode 107 of one of the two batteries 103 is juxtaposed to the negative electrode 108 of the other battery 103 while the negative electrode 108 of the one battery 103 is juxtaposed to the positive electrode 107 of the other battery 103. Namely, the plurality of small batteries 103 are stacked together in such a manner that the positive electrodes 107, as well as the negative electrodes 108, are alternately reversely directed.

The bus bars 104 are made of electrically-conductive metal, and have a strip-like shape. The bus bars 104 are embedded in the casing 105, and when the casing 105 covers the end portions of the small batteries 103, the bus bar 104 electrically connects the adjacent positive and negative electrodes 107 and 108 together. The casing 105 covers the end portions of the stacked small batteries 103. The electrode cover 106 is made of an insulative synthetic resin or the like, and is attached to the casing 105. When the electrode cover 106 is attached to the casing 105, this cover 106 covers the electrodes 107 and 108 and the bus bars 104.

In an assembled condition of the power source device 101, when connecting at least one of the electrodes 107 and 108, for example, to an electric motor or the ground (earth), it was necessary to once remove the electrode cover 106 from the casing 105. Therefore, there was a fear that dust, dirt, moisture and others in the ambient atmosphere would deposit on the electrodes 107 and 108, and in the worst case, the electrodes 107 and 108 could be short-circuited.

Therefore, care must be taken to prevent dust, dirt, moisture and others from depositing on the electrodes 107 and 108 during the operation in which the electrode was connected to the external device such as an electric motor and the ground. Therefore, there was a fear that the efficiency of the operation was lowered. Also in the maintenance operation of the power source device 101, the electric cover 106 was removed to expose many electrodes 107 and 108, and therefore there was a fear that the efficiency of the operation was lowered.

SUMMARY OF THE INVENTION

It is therefore an object of the present invention to provide a battery cover which prevents a connecting operation (for connecting an external device to an electrode of a battery) and a maintenance operation of the battery from being lowered in efficiency.

To achieve the above object, according to a first aspect of the present invention, there is provided a battery cover attachable to a battery assembly so as to partially cover the battery assembly, wherein the battery assembly includes at least two batteries each having a positive electrode at a first end thereof and a negative electrode at a second end thereof, the batteries being stacked together so that the positive electrode of one of the batteries and the negative electrode of the other one of the batteries are alternately juxtaposed. The battery cover comprises a cover body attachable to the battery assembly, a hinge, and at least one opening/closing cover pivotably connected to the cover body through the hinge, wherein when the cover body has been attached to the battery assembly, the opening/closing cover can be displaced relative to the cover body between an open position where at least one of the juxtaposed positive and negative electrodes is exposed with the opening/closing cover and a closed position where the at least one of the juxtaposed positive and negative electrodes is covered with the opening/closing cover.

In accordance with the first aspect of the present invention, only the electrode, which is required to be connected to an external device or other can be exposed while the electrodes, which are not required to be connected to any external device or other, are kept covered with the battery cover.

According to a second aspect of the present invention, it is preferable that the hinge is formed integrally with the cover body and the opening/closing cover, and is smaller in thickness than the cover body and the opening/closing cover.

In accordance with the second aspect of the present invention, the hinge, pivotably connecting the opening/closing cover to the cover body, is a self-hinge, and therefore the number of the component parts of the battery cover is reduced.

DETAILED DESCRIPTION OF THE PREFERRED EMBODIMENT

Figure 2:
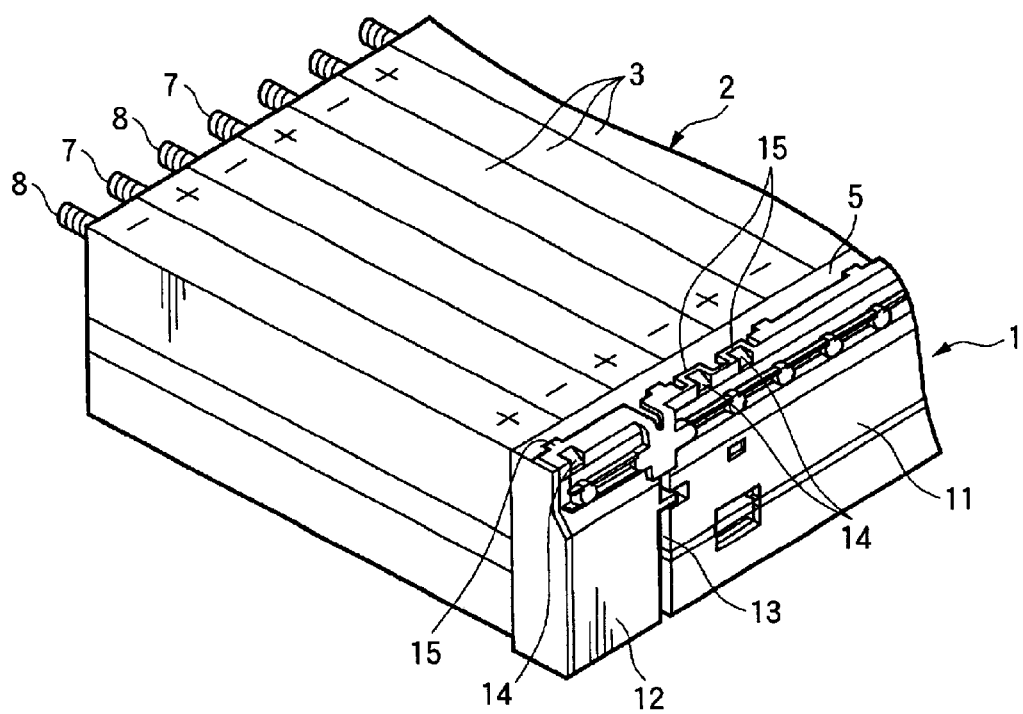
FIG. 2 is a perspective view showing a condition in which an opening/closing cover of the battery cover of FIG. 1 is disposed in a closed position.
Figure 3:
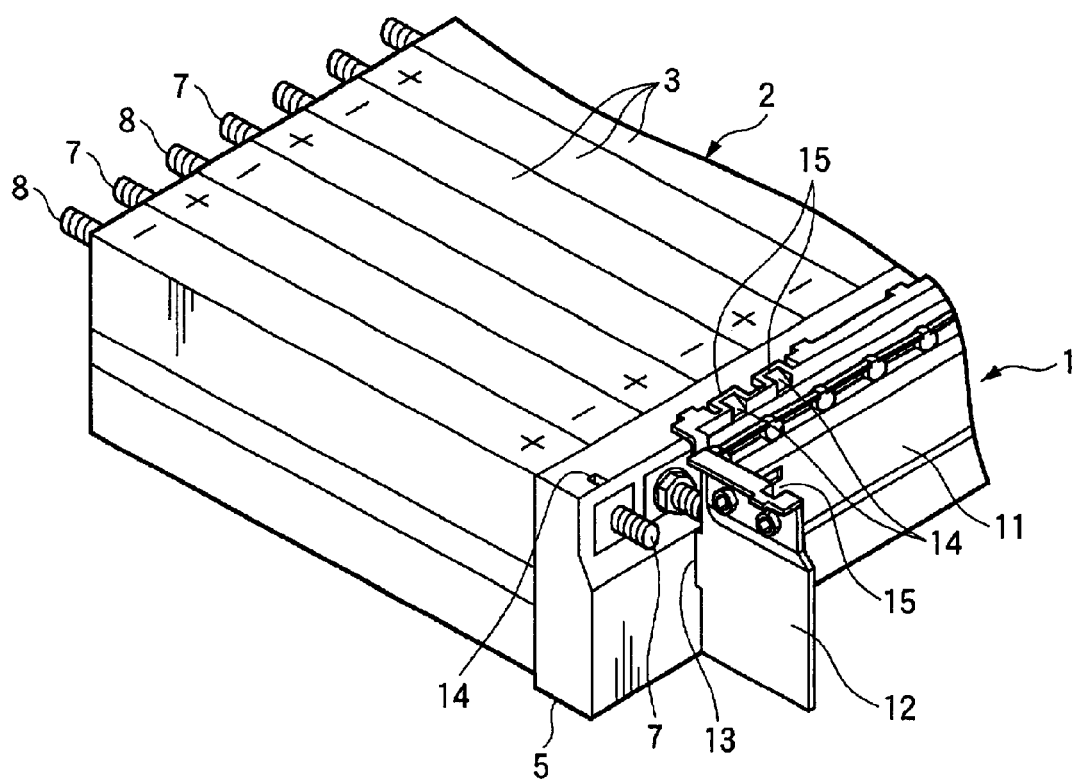
FIG. 3 is a perspective view showing a condition in which the opening/closing cover of the battery cover of FIG. 1 is disposed in an open position.
Figure 4:
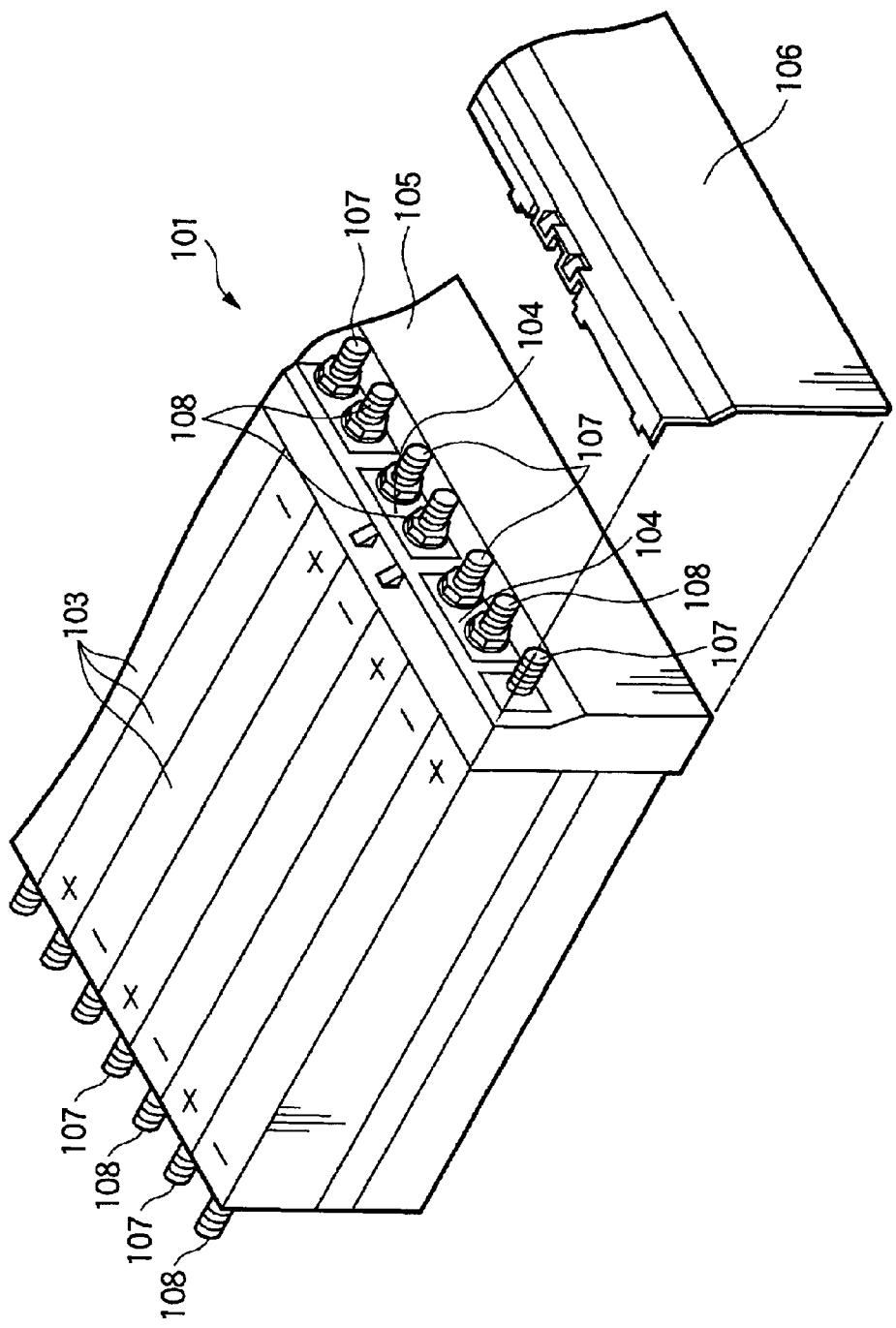
FIG. 4 is a perspective view of a power source device provided with a related battery cover.

One preferred embodiment of a battery cover 1 of the present invention will now be described with reference to FIGS. 1 to 3. The battery cover 1 forms a part of a power source device 2 shown in FIG. 1. The power source device 2 is mounted on a vehicle such as a hybrid car (capable of traveling by driving forces of both of an internal combustion engine and an electric motor) and an electric car capable of traveling by a driving force of an electric motor.

The power source device 2 comprises a plurality of small batteries 3, a plurality of bus bars 4, a casing 5, and the battery cover 1 forming one preferred embodiment of the present invention. The small batteries 3 have a square cross-section, and extend in one direction, and each small battery 3 has a positive electrode 7 provided at one end thereof whereas a negative electrode 8 is provided at the other end thereof. Each of the electrodes 7 and 8 has a rod-like shape, and projects from the surface of the small battery 3, and a thread groove, with which a nut or the like can be threadedly engaged, is formed in an outer peripheral surface of each electrode.

The small batteries 3 are stacked together in such a manner that the positive electrodes 7 are disposed in adjoining relation to the corresponding negative electrodes 8, respectively. Any two adjacent small batteries 3 are disposed such that the positive electrode 7 of one of the two batteries 3 is juxtaposed to the negative electrode 8 of the other battery 3 while the negative electrode 8 of the one battery 3 is juxtaposed to the positive electrode 7 of the other battery 3. Namely, the plurality of small batteries 3 are stacked together in such a manner that the positive electrodes 7, as well as the negative electrodes 8, are alternately reversely directed.

The bus bars 4 are made of electrically-conductive metal, and have a strip-like shape. The bus bar 4 has through holes formed respectively through opposite end portions thereof, and the electrodes 7 and 8 can be passed through these through holes, respectively.

The casing 5 is made of an insulative synthetic resin or the like, and has a hood-like shape so as to cover the end portions of the stacked small batteries 3. The casing 5 has holes 10, and when the casing 5 covers the end portions of the stacked small batteries 3, the electrodes 7 and 8 of those small batteries, disposed respectively at opposite ends spaced from each other in the stacking direction, are passed through these holes 10, respectively. The casing 5 has a plurality of projections 14 projecting outwardly therefrom.

The plurality of bus bars 4 are embedded in the casing 5. When the casing 5 covers the end portions of the stacked small batteries 3, the electrodes 7 and 8 of those small batteries 3, disposed respectively at the above-mentioned opposite ends, are exposed through the holes 10, respectively. The casing 5 allows the electrodes 7 and 8 of other small batteries 3 than those small batteries 3, disposed respectively at the above-mentioned opposite ends, to be exposed through the through holes in the bus bars 4.

After the casing 5 covers the end portions of the stacked small batteries 3, terminals (not shown) each with a feeder are electrically connected respectively to the electrodes 7 and 8, exposed respectively through the holes 10, by nuts or the like. Wires each with the feeder are electrically connected to an external device such as an electric motor and a generator.

After the casing 5 covers the end portions of the stacked small batteries 3, nuts are threaded respectively on the electrodes 7 and 8 exposed respectively through the through holes. When the nuts are thus threaded respectively on the electrodes 7 and 8 exposed respectively through the through holes, each bus bar 4 electrically connects the adjacent positive and negative electrodes 7 and 8 together, so that the small batteries 3 are serially connected together.

Figure 1:
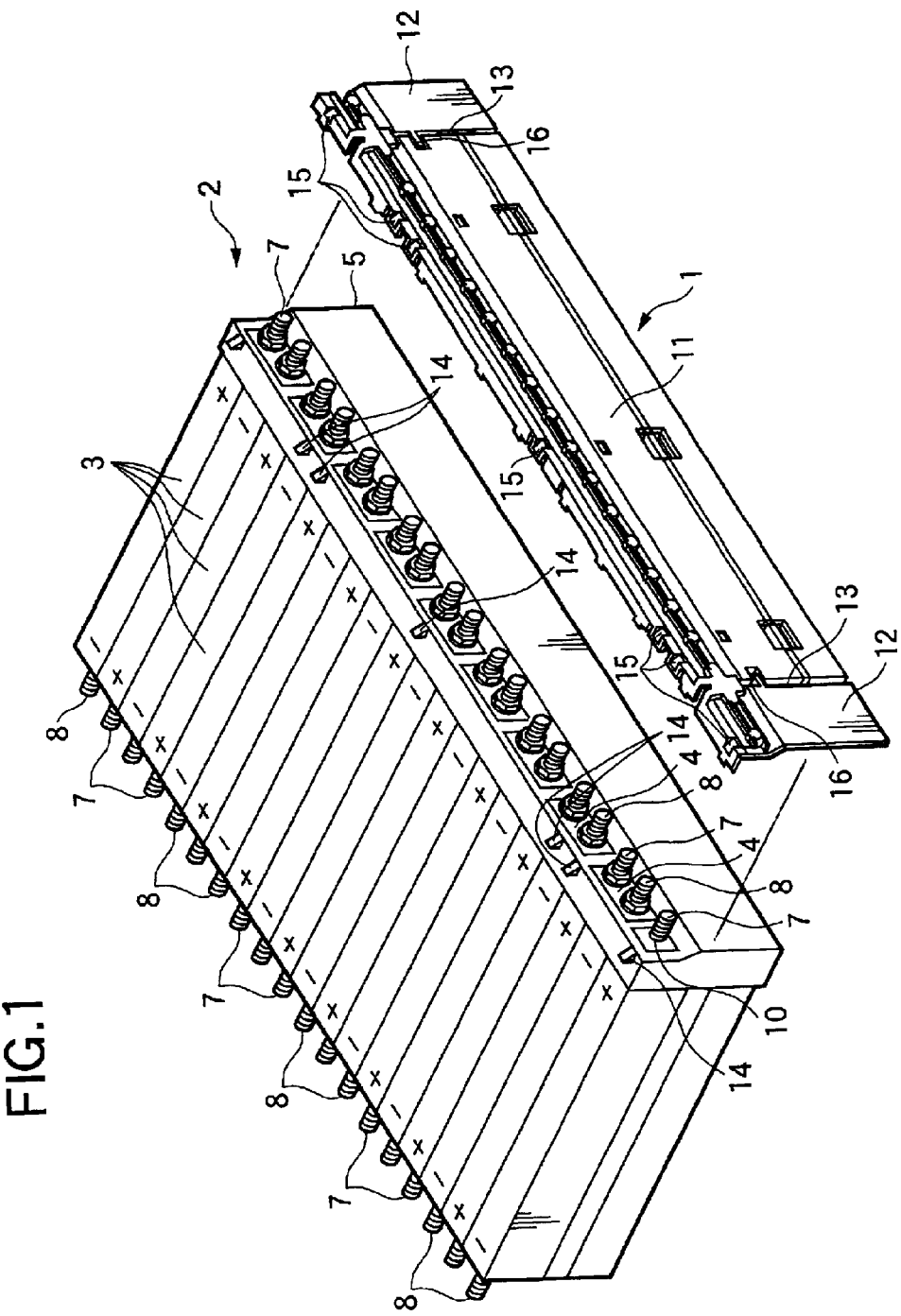
FIG. 1 is a perspective view of a power source device provided with one preferred embodiment of a battery cover of the present invention.

Although only one casing 5, covering one end portions of the small batteries 3 (which are disposed at the front side in FIG. 1), is shown, the power source device 2 of this embodiment is provided with another casing covering the other end portions of the small batteries 3 which are disposed at the rear side in FIG. 1, and the showing of this casing is omitted in FIG. 1. This casing is substantially identical in construction to the casing 5. The plurality of small batteries 3, the plurality of bus bars 4 and the casing 5 jointly form a battery assembly.

The battery cover 1 is made of an insulative synthetic resin or the like, and has a strip-like shape. The battery cover 1 is attached to the casing 5, and covers the electrodes 7 and 8, exposed respectively through the through holes and the holes 10, and the bus bars 4 each connecting the corresponding electrodes 7 and 8 together.

As shown in FIG. 1, the battery cover 1 comprises a cover body 11, opening/closing covers 12, hinges 13, and a positioning mechanism 16. The cover body 11 and the opening/closing covers 12 have claws 15 which can be releasably engaged with the corresponding projections 14, respectively. When these claws 15 are engaged with the projections 14, respectively, the cover body 11 and the opening/closing covers 12 cover the electrodes 7 and 8 of the small batteries and the bus bars 4.

Each of the opening/closing covers 12 is pivotally connected to the cover body 11 by the hinge 13. The opening/closing covers 12 are connected to the opposite longitudinal ends of the cover body 11, respectively. The cover body 11 is attached to the casing 5, and in this condition the opening/closing covers 12 can be displaced through the respective hinges 13 between their respective closed positions (shown in FIG. 2) where the opening/closing covers 12 respectively cover the electrodes 7 and 8 of the two small batteries 3, disposed respectively at the opposite ends, and their respective open positions (shown in FIG. 3) where the electrodes 7 and 8 of the two small batteries 3, disposed respectively at the opposite ends, are exposed. In the open position of each opening/closing cover 12, the claw 15 thereof is not engaged with the projection 14.

Each hinge 13 is a self-hinge formed integrally with the cover body 11 and the corresponding opening/closing cover 12. The hinge 13 is smaller in thickness than the cover body 11 and the opening/closing cover 12. The positioning mechanism 16 has the function of holding the opening/closing cover 12 in the open position when this cover 12 is displaced to the open position.

Therefore, the battery cover 1 is made of an insulative synthetic resin or the like in such a manner the cover body 11, the opening/closing covers 12 and the hinges 13 are integrally formed with one another.

In this embodiment, the opening/closing covers 12 are displaceable between their respective open positions where the electrodes 7 and 8 of the two small batteries 3, disposed respectively at the opposite ends, are exposed and their respective closed positions where the opening/closing covers 12 respectively cover the electrodes 7 and 8 of the two small batteries 3 disposed respectively at the opposite ends. Therefore, in this battery cover 1, the electrodes 7 and 8 of the two small batteries 3 (disposed respectively at the opposite ends), which are required to be connected to an external device or other, can be exposed while the electrodes 7 and 8 (other than the electrodes 7 and 8 of the above two small batteries 3), which are not required to be connected to any external device or other, are kept covered with the battery cover 1.

Therefore, during the connection operation for connecting the power source device 2 to the external device, the contact of dust, dirt and others in the atmosphere with the other electrodes 7 and 8 can be suppressed, and besides the contact of the worker with the other electrodes 7 and 8 can be prevented. Therefore, the efficiency of the operation for connecting the power source device to the external device is enhanced, and the efficiency of maintenance of the power source device 2 is enhanced.

In the battery cover 1, the cover body 11, the opening/closing covers 12 and the hinges 13 are formed integrally with one another, and therefore the number of the component parts of the battery cover 1 is reduced, and the time, labor and cost, required for producing the battery cover 1, can be reduced.

In the above embodiment, the external device is adapted to be connected to the electrodes 7 and 8 disposed respectively at the opposite ends, and the opening/closing covers 12 are provided so as to cover and expose the electrodes 7 and 8 of the two small batteries 3 disposed respectively at the opposite ends. In the present invention, however, the external device may be connected to any two preselected electrodes 7 and 8 among the plurality of juxtaposed electrodes 7 and 8. In this case, the opening/closing covers 12 are so arranged as to cover and expose the above two preselected electrodes 7 and 8.

In this embodiment of the present invention, although the opening/closing covers 12 are provided so as to cover and expose only the electrodes 7 and 8 of the two small batteries 3 disposed respectively at the opposite ends, the opening/closing cover or covers 12 may be so arranged as to cover and expose one or more than two electrodes 7 and 8.

In this embodiment of the present invention, the battery cover 1 is adapted to be attached to the casing 5. However, in the case where the casing 5 for covering the end portions of the small batteries 3 is not mounted on the power source device 2, the battery cover 1 can be attached directly to the small batteries 3.

As described above, only the electrodes, which are required to be connected to the external device or other, can be exposed while the other electrodes, which are not required to be connected to any external device or other, are kept covered with the battery cover. Therefore, during the connection operation for connecting the battery assembly to the external device, the contact of dust, dirt and others in the atmosphere with the other electrodes can be suppressed, and besides the contact of the worker with the other electrodes can be prevented. Therefore, the efficiency of the operation for connecting the battery assembly to the external device is enhanced, and the efficiency of maintenance of the power source device, including the battery assembly, is enhanced.

Moreover, the hinge, pivotably connecting the opening/closing cover to the cover body, is a self-hinge, and therefore the efficiency of the operation for connecting the battery assembly to the external device is enhanced, and the efficiency of maintenance of the power source device, including the battery assembly, is enhanced, and besides the number of the component parts of the battery cover can be reduced.

What is claimed is:

1. A system comprising:
   a battery cover;
   a battery assembly,
   a cover body attachable to the battery assembly comprising a plurality of batteries so that a plurality of first electrodes are covered, wherein the battery assembly comprises the first electrodes and at least one second electrode which are formed on a first face of the battery assembly;
   a hinge; and
   at least one opening/closing cover pivotably connected to the cover body through the hinge,
   wherein when the cover body is attached to the battery assembly, the opening/closing cover is movable relative to the cover body between an open position where the at least one second electrode is exposed with the opening/closing cover and a closed position where the at least one second electrode is covered with the opening/closing cover;
   wherein said battery assembly further comprises:
   a casing comprising a plurality of holes;
   wherein said plurality of first electrodes and said at least one second electrode are passed through the holes.

2. A system according to claim 1, wherein the hinge is formed integrally with the cover body and the opening/closing cover, and is smaller in thickness than the cover body and the opening/closing cover.

3. A system according to claim 1, wherein said casing is of a hood-like shape.

4. A system according to claim 1, wherein said battery assembly further comprises:
   a plurality of bus bars embedded in the casing;
   wherein said bus bars comprise electrically conductive metal; and
   wherein said bus bars have a strip-like shape.

5. A system according to claim 1, wherein said hinge comprises a self-hinge.

6. A system according to claim 1, wherein said battery cover comprises insulative synthetic resin.

7. A system according to claim 1, wherein said battery assembly further comprises:
   a first and a second casing;
   wherein said first casing covers the first face of said battery assembly; and
   wherein a second casing covers a second face of said battery assembly.

8. A system according to claim 1, wherein said battery cover further comprises:
   a positioning mechanism;
   wherein said positioning mechanism holds the opening/closing cover in the open position when the cover is displaced to the open position.

9. A system according to claim 1, wherein said cover body comprises claws;
   wherein said casing comprises projections;
   wherein said claws are releasably engaged with the projections during the closed position and the claws are not engaged with the projections during the open position.

10. A system according to claim 1, wherein said plurality of batteries comprise a square-cross section.

\* \* \* \* \*